United States Patent [19]

Williams et al.

[11] Patent Number: 5,179,674
[45] Date of Patent: Jan. 12, 1993

[54] METHOD AND APPARATUS FOR PREDICTING VALID PERFORMANCE OF VIRTUAL-ADDRESS TO PHYSICAL-ADDRESS TRANSLATIONS

[75] Inventors: Douglas D. Williams, Pepperell; David M. Fenwick, Chelmsford; Timothy J. Stanley, Leominster, all of Mass.

[73] Assignee: Digital Equipment Corporation, Maynard, Mass.

[21] Appl. No.: 224,443

[22] Filed: Jul. 25, 1988

[51] Int. Cl.[5] .................................. G06F 12/10
[52] U.S. Cl. ........................ 395/400; 364/DIG. 1; 364/232.21; 364/256.3
[58] Field of Search ... 364/200 MS File, 900 MS File; 395/800

[56] References Cited

U.S. PATENT DOCUMENTS

| | | | |
|---|---|---|---|
| 4,620,275 | 10/1986 | Wallach et al. | 364/200 |
| 4,811,215 | 3/1989 | Smith | 364/200 |
| 4,926,317 | 5/1990 | Wallach et al. | 364/200 |

FOREIGN PATENT DOCUMENTS 0146943  3/1985  European Pat. Off.

OTHER PUBLICATIONS

J. W. Plant et al., "Page boundary crossing detection hardware", IBM Technical Disclosure Bulletin, vol. 19, No. 1, Jun. 1976.

*Primary Examiner*—Gareth D. Shaw
*Assistant Examiner*—Kakali Chaki
*Attorney, Agent, or Firm*—Kenyon & Kenyon

[57] ABSTRACT

A prediction logic device operating in conjunction with a vector processor to predict, before the completion of the translation of the virtual addresses of all of the data elements of a vector, the valid performance of all virtual-address to physical-address translations for the data elements of the vector. The prediction logic device asserts an MMOK signal to a scalar processor when it becomes known that no memory management fault and/or translation buffer miss will occur such that the scalar processor can resume vector instruction issue to the vector processor at the earliest possible time.

6 Claims, 4 Drawing Sheets

METHOD AND APPARATUS FOR PREDICTING VALID PERFORMANCE OF VIRTUAL-ADDRESS TO PHYSICAL-ADDRESS TRANSLATIONS

FIELD OF THE INVENTION

The invention is directed to a computer system and, more particularly, to a prediction logic device for improving the performance of multiple processors of the computer system, which multiple processors are coupled to one another in a synchronous, master-slave relationship.

BACKGROUND OF THE INVENTION

Many modern computer systems implement a variety of operating features, each designed to improve the overall speed of operation of the system. For example, the computer system may include multiple processors coupled to one another in a synchronous, master-slave relationship and utilize an instruction pipeline to increase the speed of execution of the various instructions required by an application program.

Moreover, the computer system may further include a virtual address space and a physical memory to facilitate the construction of multiple application programs for processing by the computer system, as is well known. One advantageous computer system configuration comprises a scalar central processing unit coupled in a synchronous, master-slave relationship to a vector processor.

A vector processor is designed to perform high speed execution of program loops on a vector, which may be defined as an array of data elements stored in the computer system's memory with a fixed increment or stride between successive data elements of the vector. A vector's stride is defined as the number of memory locations, typically in bytes, between the starting addresses of consecutive vector elements. For example, a contiguous vector that has longword elements (four contiguous bytes) has a stride of four and a contiguous vector that has quadword elements (eight contiguous bytes) has a stride of eight. Vectors most often represent rows or columns of matrices or tables, as for example, arrays of measured temperatures, pressures and other physical variables relating to the solution of a scientific problem. The vector processor operates through the execution of vector instructions constructed to directly perform computational tasks in vector or array form. Such vector instructions are far more efficient than conventional loop operations of a scalar processor.

In the synchronous, master-slave coupling arrangement between the scalar central processing unit and the vector processor, the scalar central processing unit fetches all instructions and, when it recognizes a vector instruction, issues the vector instruction to the vector processor for execution. If a vector instruction that depends upon the result of a previous vector instruction is issued and the previous vector instruction caused a memory management fault in the vector processor, it would be very difficult to restore the instruction pipeline and restart the instructions. Accordingly, the scalar pipeline is typically stalled until the vector processor indicates that there was no fault during the load/store operation relating to the previous vector instruction.

It should be understood that, as is well known, the purpose of a pipelined operation is to increase the speed of operation of the computer system through overlapped execution of instructions. The overlapped operation advantage of a pipeline is defeated during the time the scalar pipeline is stalled while the scalar central processing unit is awaiting a no fault indication from the vector processor. Thus, the time it takes a vector processor to assert a signal indicating that there will be no fault greatly affects the overall speed of operation of the master-slave scalar and vector processors. More specifically, the earlier the vector processor can determine that no fault has occurred, the earlier the scalar central processing unit can resume vector instruction issue and refill the instruction execution pipeline.

For purposes of the present invention, the term fault is defined as a memory management fault. As discussed above, the present invention contemplates a computer system having a virtual address space and a physical memory. In such computer systems, a translation scheme is provided to translate a virtual address to a physical address such that data referenced by a virtual address and residing in the physical memory may be fetched by translating the virtual address into a corresponding physical address. All application programs to be processed by the computer system are constructed with reference to the virtual address space by use of virtual addresses which define the locations of instructions and data required by the program within the virtual address space. The computer system is provided with a mechanism to dynamically translate the virtual addresses generated by the program being executed into correct physical memory locations, each defined by a unique physical address.

During the execution of the program, the scalar processor continues to reference data and instructions by virtual addresses and issues information relating to the virtual addresses for the data elements of the vector to the vector processor. A translation mechanism must be provided in the vector processor to continuously translate the virtual addresses of the data elements into corresponding physical addresses where the data elements may be found in the main physical memory.

Typically, the virtual memory space is divided into memory units called pages. A page contains a predetermined number of basic addressable units. For example, the basic addressable unit may comprise an 8-bit byte and a page may contain 512 bytes. The format for a virtual address to uniquely identify a basic addressable unit would be the virtual page number containing the addressable unit and the byte number of the addressable unit within the specified page. A page table is maintained in the physical memory to cross reference virtual addresses to physical addresses. As the computer system dynamically transfers data to and from auxiliary memory devices, it generates page frame numbers which define 512 byte pages of physical memory to be used on references to the virtual addresses. A page table entry is provided for each virtual page then residing in physical memory. The page frame number assigned to a particular virtual page at the time of a transfer of the related data from auxiliary memory to main memory is stored in the page table entry for that virtual page.

Accordingly, in concept, a physical address corresponding to a particular virtual address can be obtained by fetching the page table entry for the virtual page containing that virtual address from physical memory and merging the byte number of the addressable unit of data with the page frame number contained in the page table entry. However, in practice, the vector processor maintains a translation buffer that is a special purpose cache of recently used page table entries. Most often, the translation buffer already contains the page table entries for the virtual addresses being used by a program and the processor need not access physical memory to obtain them.

In known computer systems, the translation buffer is in the translation mechanism which is coupled on a timing-critical data path between the vector processor and the physical memory system. The translation mechanism ascertains the page frame number for the virtual page number of the virtual address to be translated from the translation buffer and attaches the byte number of the virtual address to the page frame number listed in the translation buffer to provide the physical address.

Memory management encompasses the operation of the translation mechanism and the loading of the translation buffer with page table entry information. A translation buffer hit is said to occur when the translation buffer contains the page table entry relating to a particular virtual address. A memory management fault is defined as a translation buffer hit wherein, e.g., a protection code does not permit the program being processed to access the physical page specified by the page table entry required to complete the translation. A translation buffer miss occurs when the translation buffer does not contain a virtual page number for the virtual address to be translated and, therefore, cannot provide the translation mechanism with the physical address information required to complete the virtual-address to physical-address translation. When a translation buffer miss occurs, the vector processor must service the miss by loading the required page table entry into the translation buffer. In the event of a memory management fault, the vector processor suspends operation and the computer system takes an exception. As discussed above, the scalar processor is not to issue a subsequent vector instruction prior to the completion of a valid translation for each of the virtual addresses of the data elements of the vector for a previous vector instruction. A valid translation is defined as a translation buffer hit without a memory management fault.

SUMMARY OF THE INVENTION

It is a primary objective of the present invention to provide a prediction logic device to predict, before the completion of the translation of the virtual addresses of all the data elements of a vector, the valid performance of all virtual-address to physical-address translations for the data elements of the vector and to assert an MMOK signal to the scalar processor when it becomes known that no memory management fault and/or translation buffer miss will occur such that the scalar processor can resume instruction issue at the earliest possible time.

The most conservative manner to assure that no memory management fault or translation buffer miss will occur during the translation of the virtual addresses of the data elements of a vector would be to assert an MMOK signal when the virtual address of the last data element of the vector has been generated and successfully translated. However, such a scheme would not provide any time advantage inasmuch as the scalar processor would have to wait until all of the virtual addresses have been translated before resuming operation. Pursuant to the invention, the prediction logic device is operated to calculate the virtual address of the last element of the vector based upon the virtual address of the current element, i.e., the data element currently being processed for address translation, the stride and the residual vector length, i.e., the number of remaining data elements in the vector. If the virtual address for the last element, as calculated by the prediction logic device, has the same virtual page number as the virtual address for the current element and there has been a successful, valid translation of the current element's virtual address, it will be known that the virtual page number and corresponding physical address information for the last virtual address is present in the translation buffer and there will be no memory management fault. Thus, the prediction logic device compares each current virtual address to the calculated last virtual address and asserts an MMOK signal to the scalar processor when there is a match between the virtual page numbers of the last and current virtual addresses and the translation of the current virtual address is successful. This permits the scalar processor to continue operation as soon as it becomes known that the virtual address of a current element is on the same virtual page as the calculated virtual address of the last element. In many instances, it becomes known that a current virtual address is on the same page as the last virtual address prior to completion of all translations, thereby permitting an early resumption of scalar processor operation. Simulations of operation of the present invention indicate up to a 20% increase in the speed of operation of the scalar and vector processors when utilizing the prediction logic device of the present invention.

In accordance with another feature of the invention, the calculation of the virtual address of the last element is performed by a conservative approximation of the last virtual address implemented through shift-left hardware to increase calculation speed and simplify the hardware requirements for the prediction logic device, as will appear. The conservative approximation is such that if the current virtual address is on the same virtual page as the approximate last virtual address it will definitely be on the same page as the actual last virtual address. The shift-left implementation feature of the invention provides fast and efficient hardware operation for the prediction logic device at an acceptable reduction in prediction accuracy.

Pursuant to yet another feature of the invention, the prediction accuracy of the conservative approximation mode of the invention is increased by operating the prediction logic device to continuously calculate, by conservative approximation, the virtual address for the last data element of the vector by calculating an approximate last virtual address for each vector element based upon the virtual address of each current element, the stride and the remaining element count. A continuous approximate calculation operation by the prediction logic device will result in a convergence of the approximate last virtual address toward the actual last virtual address and improve prediction accuracy as the vector processor continues to translate the virtual addresses of the data elements of the vector. For a better understanding of the above and other features and advantages of the present invention, reference should be made to the following detailed description and to the accompanying drawings.

DETAILED DESCRIPTION

Figure 1:
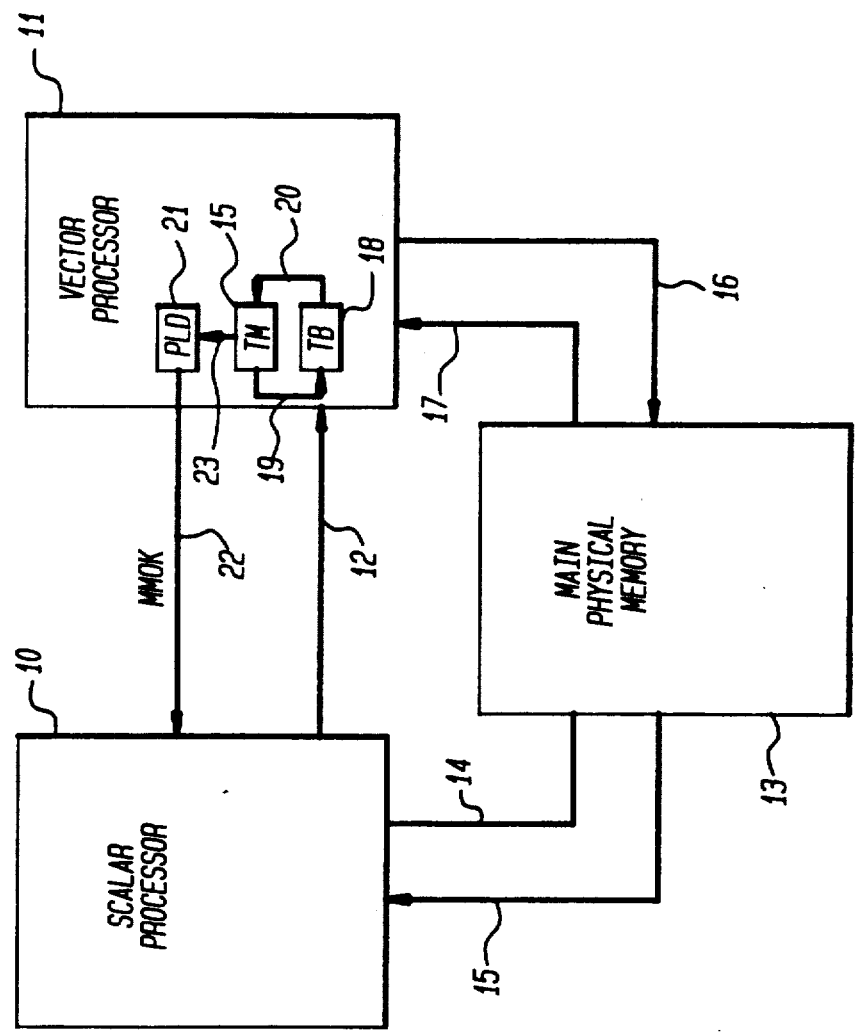
FIG. 1 is a block diagram of a first processor coupled to a second processor wherein the processors are coupled in a synchronous, master-slave relationship.

Referring now to the drawings and initially to FIG. 1, there is illustrated a computer system according to the present invention. The computer system includes a scalar processor 10 coupled to a vector processor 11 by a bus 12. The scalar processor 10 acts as a master processor operable to initiate and control the operation of the slave vector processor 11 by issuing all vector instructions and related data address information to the vector processor 11 via the bus 12. Generally, the scalar processor 10 operates as a central processing unit and executes the instructions of an application program. The scalar processor 10 fetches the instructions and data required by the application program from a main physical memory 13 by sending appropriate address information over an address bus 14 to the main physical memory 13 and receiving the related instructions and data from the main physical memory 13 over a bus system 15.

When the scalar processor 10 recognizes that a particular instruction is a vector instruction, the scalar processor 10 issues the vector instruction to the vector processor 11 over the bus 12 for speedy execution by the vector processor 11. The vector instruction includes base address, vector length, vector stride and other vector information to enable the scalar processor 10 to generate and issue to the vector processor 11 the virtual address information for the data elements of the vector to be processed in accordance with the issued vector instruction.

As discussed above, the vector processor 11 includes a translation mechanism 15 to serially translate each of the virtual addresses of the data elements into corresponding physical addresses. Each of the physical addresses is transmitted over an address bus 16 to the main physical memory 13. In this manner, the main physical memory 13 is enabled to locate and transmit the individual data elements of the vector over a data bus 17 back to the vector processor 11 for processing in accordance with the issued vector instruction. In some implementations, a cache memory is provided in the vector processor 11 to increase the speed of data fetches, as is well known. In any event, each virtual address issued to or generated by the vector processor 11 must be translated into a corresponding physical address.

For the purpose of memory management—specifically, the protection and translation of virtual addresses to physical addresses—the unit of memory is a page. A page comprises a fixed number of addressable units, e.g. 512 bytes. Pages are naturally aligned; that is, the address of the first byte of a page is a multiple of 512. Virtual addresses are 32 bits long, and are partitioned by the memory management logic as shown in FIG. 2.

Figure 2:
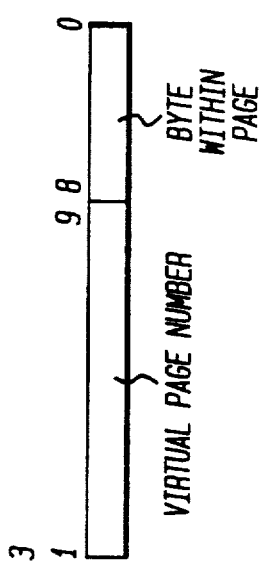
FIG. 2 is a graphic illustration of a virtual address.

Referring now to FIG. 2, the bits of a virtual address (VA) function, as follows:

Field Extent: Bits 31:9 (VA<31:9>)
Field Name: Virtual Page Number (VPN)
Function: The virtual page number field specifies the virtual page to be referenced. There may be, for example, 8,388,608 pages in each virtual address space. Each page contains 512 bytes.

Field Extent: Bits 8:0 (VA<8:0>)
Field Name: Byte Number
Function: The byte number field specifies the byte address within the page. As indicated, a page contains 512 bytes.

Figure 3:
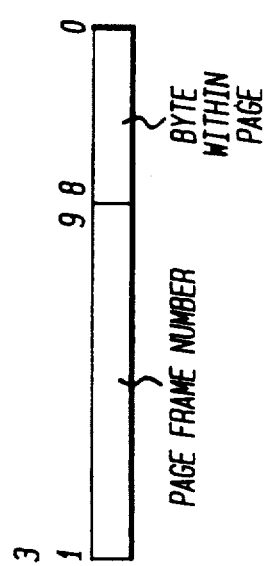
FIG. 3 is a graphic illustration of a physical address.

Moreover, as illustrated in FIG. 3, the bits of a physical address function, as follows:

Field Extent: Bits 29:9
Field Name: Page Frame Number (PFN)
Function The page frame number field specifies the upper 21 bits of the physical address of the base of the page location in the physical memory.

Field Extent: Bits 8:0
Field Name: Byte Number
Function: The byte number field specifies the byte location within the page in physical memory. This number is unchanged in the address translation process.

Figure 4:
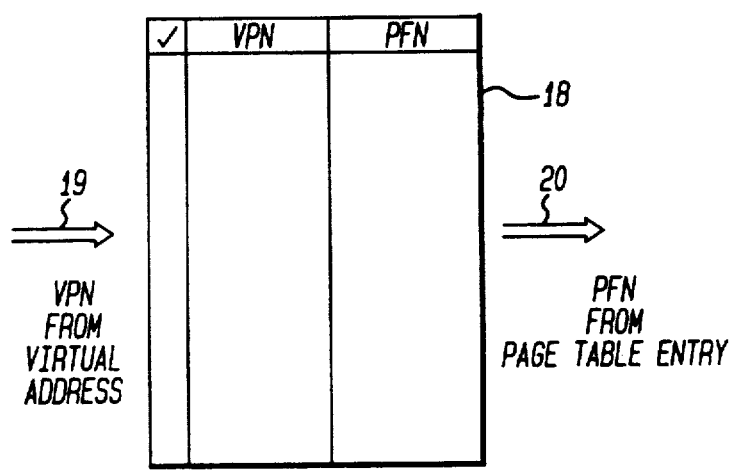
FIG. 4 is a simplified representation of the translation buffer of the second processor of FIG. 1.

Referring once again to FIG. 1, the translation mechanism 15 is coupled to the input of a translation buffer 18 by a bus 19. In accordance with a known operation, the translation mechanism 15 extracts the virtual page number (VPN) <31:9> from the virtual address to be translated and sends the virtual page number over bus 19 to the translation buffer 18. As illustrated in FIG. 4, the translation buffer maintains a listing of virtual page numbers (VPN's) and corresponding page frame numbers (PFN's). The translation buffer 18 will look up the virtual page number provided by the translation mechanism 15 over bus 19 and send the corresponding page frame number over a bus 20 to the translation mechanism 15. A translation buffer hit is defined as a successful completion of the above-described lookup operation.

Assuming a translation buffer hit and no memory management fault, the translation mechanism 15 completes the translation of the virtual address by executing the following algorithm:

$$PA = <PFN>' VA<8:0>$$

wherein PFN is the page frame number listed in the translation buffer opposite the virtual page number and VA<8:0> is the byte number of the virtual address to be translated. The apostrophe indicates a concatenation between <PFN> and VA <8:0>. The translation operation is continued until each of the virtual addresses of the data elements of the vector is translated into a corresponding physical address such that the data elements may be fetched from the physical memory system.

A translation buffer miss is said to occur when the translation buffer 18 is presented with a virtual page number for which it cannot provide a page frame number. In this event, the vector processor 11 must fetch the page table entry for that virtual page number from the main physical memory 13, as discussed above, and load the translation buffer 18 with the corresponding page frame number contained in the page table entry so that the translation mechanism 15 can proceed to complete the translation. Each translation buffer load operation takes a certain amount of time to complete and the scalar processor 10 must not pipeline subsequent vector instructions until all translation buffer misses of the current vector instruction are serviced by the vector processor 11. Accordingly, the scalar processor 10 will not load a next vector instruction into its instruction pipeline until it is certain that there will be no memory management faults or translation buffer misses, in connection with the processing of a current vector instruction.

Pursuant to the present invention, a prediction logic device 21 is provided in the vector processor 11 to predict the valid, fault free, all hit translation of the virtual addresses of all the data elements of a particular vector and to send an MMOK signal over a line 22 to the scalar processor 10 when the prediction logic device 21 predicts that there will be no memory management faults or translation buffer misses for the particular vector. The MMOK signal enables the scalar processor 10 to immediately continue operation without having to wait for the completion of the translation of all the virtual addresses related to any particular vector in those instances when the translation buffer 18 contains the necessary translation information for all of the data elements of the particular vector and the page table entries do not contain protection codes prohibiting access thereto by the program being processed. As illustrated in FIG. 1, the prediction logic device 21 is coupled to the translation mechanism 15 by a bus system 23 such that virtual address information and the status of the translation operation, i.e., valid hit or miss, can be transmitted to the prediction logic device 21. The vector processor 11 also provides vector stride and vector length information to the prediction logic device 21 to enable the device 21 to predict valid translation operation, as will now be described.

In accordance with the general concept of the present invention, the virtual address of the last element is calculated by the prediction logic device 21 at the start of a vector load/store operation, as follows:

LastVirtADDR = FirstVirtADDR + ((VLENGTH − 1) * VSTRIDE)

wherein LastVirtADDR is the virtual address of the last data element of a particular vector; FirstVirtADDR is the virtual address of the first data element of the particular vector; VLENGTH is the length of the vector and VSTRIDE is the vector stride. Moreover, as used hereinafter, CurrentVirtADDR is the virtual address of a data element currently undergoing address translation.

The value of LastVirtADDR is calculated once at the beginning of the vector load/store operation. Every element virtual address is compared to LastVirtADDR to determine if both reside in the same virtual page. Virtual addresses are used in the MMOK prediction logic because virtual pages are contiguous, while physical pages are not. This allows the MMOK prediction to proceed in parallel with virtual address translation. Pseudo-code describing this is as follow:

```
/* Init the element count.                        */
element_count = 0
/* Get starting virtual address.                  */
CurrentVirtADDR = FirstVirtADDR
/* For every element until the end.               */
while (element_count < VLENGTH) {
    translate CurrentVirtADDR to a physical address
    if (CurrentVirtADDR <31:9> = LastVirtADDR<31:9>)
    assert MMOK
    /* Increment element count.                   */
    element_count = element_count + 1
    /* Generate next virtual address.             */
    CurrentVirtADDR = CurrentVirtADDR + VSTRIDE
} /* end while. */
```

If CurrentVirtADDR<31:9> are equal to LastVirtADDR<31:9>, the addresses are in the same virtual page and MMOK can be asserted. If the addresses are not in the same virtual page, the prediction logic device 21 will continue the generation of addresses and the comparison of CurrentVirtADDR<31:9> to LastVirtADDR <31:9>

It should be noted that there is a multiply in the formula for calculating the last element virtual address, i.e., ((VLENGTH − 1) * VSTRIDE). A full multiplier is a relatively complex logic hardware device. Accordingly, in one preferred embodiment of the invention, an approximation of the last virtual address is calculated by utilizing a shift-left operation. A shift-left of an integer multiplicand is equivalent to a multiply by two. A shift-left of an integer multiplicand twice multiplies it by four, and so on. The shift-left is also fast and efficient in hardware. Therefore, an approximation of the ((VLENGTH − 1) * VSTRIDE) multiplication can be calculated as follows:

1. Round up one multiplicand (i.e., (VLENGTH − 1) or VSTRIDE) to the next highest power of two.
2. Take its log base2.
3. Shift-left the other multiplicand by the amount of log base 2 to calculate an upper bound of the last element virtual address.

Because the value of one multiplicand is rounded up (which is necessary to reach a next highest power of two to enable the use of a shift-left), the prediction logic device 21 is no longer calculating the exact last element virtual address Rather, the prediction logic device 21 is now calculating an upper bound on the last element virtual address. The actual last element virtual address will always be less than or equal to this upper bound.

Ease of logic design may dictate other log base2 approximations. For example, a priority encoder almost performs the log base2 function. The table below shows the true log base2, the roundup approximation of log base2, and a priority encoder approximation of log base2 for 0 through 16. Note that the roundup approximation is better than the priority encoder approximation. Both give values that are greater than or equal to the actual log base2 so that the last virtual address approximation is always greater than or equal to the actual last virtual address.

TABLE I

LOG BASE2 APPROXIMATIONS

| operand B | | log base2 B | roundup approx of log base2 B | priority encod implementation of log base2 B |
|---|---|---|---|---|
| 0 | 0000000 | — | 0 | 0 |
| 1 | 0000001 | 0 | 0 | 1 |
| 2 | 0000010 | 1 | 1 | 2 |
| 3 | 0000011 | 1<y<2 | 2 | 2 |
| 4 | 0000100 | 2 | 2 | 3 |
| 5 | 0000101 | 2<y<3 | 3 | 3 |
| 6 | 0000110 | 2<y<3 | 3 | 3 |
| 7 | 0000111 | 2<y<3 | 3 | 3 |
| 8 | 0001000 | 3 | 3 | 4 |
| 9 | 0001001 | 3<y<4 | 4 | 4 |
| 10 | 0001010 | 3<y<4 | 4 | 4 |
| 11 | 0001011 | 3<y<4 | 4 | 4 |
| 12 | 0001100 | 3<y<4 | 4 | 4 |
| 13 | 0001101 | 3<y<4 | 4 | 4 |
| 14 | 0001110 | 3<y<4 | 4 | 4 |
| 15 | 0001111 | 3<y<4 | 4 | 4 |
| 16 | 0010000 | 4 | 4 | 5 |
| etc. | | etc. | etc. | etc. |

The above multiplication approximations are listed in order of accuracy, as follows:
1. Full integer multiply produces actual last virtual address.
2. Left shifting using the roundup approximation of log base2.
3. Left shifting using the priority encoder approximation of the log base2.

In implementing the Shift-left hardware arrangement, either (VLENGTH−1) or VSTRIDE may be shifted left. In most instances, it requires less logic to implement the approximation of log base2 of (VLENGTH−1) than log base2 of VSTRIDE. Accordingly, the preferred embodiment of the present invention approximates the log base2 of (VLENGTH−1) to shift VSTRIDE to the left.

The following are several examples of operation of the prediction logic device 21: (note that all numbers preceded by 0x are expressed in hexadecimal)

EXAMPLE 1

A one-shot prediction refers to a single calculation of the virtual address of the last data element based upon the virtual address of the first data element. Example 1 is as follows:

| ONE-SHOT MMOK PREDICTION ALGORITHM (16 BYTE STRIDE) | |
|---|---|
| FirstVirtADDR | = 0×0f00 |
| Stride | = 16 bytes (0×10) |
| Vector length | = 30 data elements |
| Log base2 (vector length - 1) | = 5 (using priority encoder approximation) |
| (using approx., i.e. round up, to next highest power of 2) | |
| Predicted approximate LastVirtADDR | = 0×0f00 + (16 * 32) |
| | = 0×0f00 +(16 << 5) |
| | = 0×0f00 + 512 |
| | = 0×0f00 + 0×200 |
| | = 0×1100 |
| Page of approximate LastVirtADDR | = 0×1000 |

TABLE II

Results of Example 1 using One-Shot MMOK prediction algorithm.

| Elem. | Virtual Address | Virtual Page | Page of Virtual Address | = Page of Virtual LastADDR? |
|---|---|---|---|---|
| 0 | 0×0f00 | 0×0e00 | | no |
| 1 | 0×0f10 | 0×0e00 | | no |
| 2 | 0×0f20 | 0×0e00 | | no |
| 3 | 0×0f30 | 0×0e00 | | no |
| 4 | 0×0f40 | 0×0e00 | | no |
| 5 | 0×0f50 | 0×0e00 | | no |
| 6 | 0×0f60 | 0×0e00 | | no |
| 7 | 0×0f70 | 0×0e00 | | no |
| 8 | 0×0f80 | 0×0e00 | | no |
| 9 | 0×0f90 | 0×0e00 | | no |
| 10 | 0×0fa0 | 0×0e00 | | no |
| 11 | 0×0fb0 | 0×0e00 | | no |
| 12 | 0×0fc0 | 0×0e00 | | no |
| 13 | 0×0fd0 | 0×0e00 | | no |
| 14 | 0×0fe0 | 0×oe00 | | no |
| 15 | 0×0ff0 | 0×0e00 | | no |
| 16 | 0×1000 | 0×1000 | | MMOK! |
| 17 | 0×1010 | 0×1000 | | |
| 18 | 0×1020 | 0×1000 | | |
| 19 | 0×1030 | 0×1000 | | |
| 20 | 0×1040 | 0×1000 | | |
| 21 | 0×1050 | 0×1000 | | |
| 22 | 0×1060 | 0×1000 | | |
| 23 | 0×1070 | 0×1000 | | |
| 24 | 0×1080 | 0×1000 | | |
| 25 | 0×1090 | 0×1000 | | |
| 26 | 0×10a0 | 0×1000 | | |
| 27 | 0×10b0 | 0×1000 | | |
| 28 | 0×10c0 | 0×1000 | | |
| 29 | 0×10d0 | 0×1000 | | |

Note that the predicted LastVirtADDR is 0×1100, but the actual last virtual address is 0×10d0. For this example, the inaccuracy of the approximation did not delay the assertion of MMOK. MMOK is asserted after the successful translation of a virtual address residing in the same virtual page as the predicted last virtual address. In this instance MMOK is asserted after the successful translation of element No. 16 permitting the scalar processor to resume instruction issue while data element Nos. 17-29 undergo address translation.

Examples could be constructed using relatively large strides where the last element virtual address approximation could be off by an entire page. Consider a vector load/store operation having a starting virtual address of 0×0f00, a vector length of 36, and a stride of 32 bytes. Again, using the priority encoder approximation of log base2, see example 2, as follows:

| EXAMPLE 2 | |
|---|---|
| One-Shot MMOK Prediction Algorithm (32 byte stride) | |
| FirstVirtADDR | = 0×0f00 |
| Stride | = 32 bytes (0×020) |
| Vector length | = 36 data elements |
| Log base2 (vector length - 1) (using approx.) | = 6 |
| Predicted approximate LastVirtADDR | = 0×0f00 + (32 * 64) |
| | = 0×0f00 + (32 << 6) |
| | = 0×0f00 + 2048 |
| | = 0×0f00 + 0×0800 |
| | = 0×1700 |
| Page of approximate LastVirtADDR | = 0×1600 |

TABLE III

Results of Example 2 using One-Shot MMOK prediction algorithm.

| Elem. | Virtual Address | Virtual Page | Page of Virtual Address | = Page of Virtual LastADDR? |
|---|---|---|---|---|
| 0 | 0×0f00 | 0×0e00 | | no |
| 1 | 0×0f20 | 0×0e00 | | no |
| 2 | 0×0f40 | 0×0e00 | | no |
| 3 | 0×0f60 | 0×0e00 | | no |
| 4 | 0×0f80 | 0×0e00 | | no |
| 5 | 0×9fa0 | 0×0e00 | | no |
| 6 | 0×0fc0 | 0×0e00 | | no |
| 7 | 0×0fe0 | 0×0e00 | | no |
| 8 | 0×1000 | 0×1000 | | no |
| 9 | 0×1020 | 0×1000 | | no |
| 10 | 0×1040 | 0×1000 | | no |
| 11 | 0×1060 | 0×1000 | | no |
| 12 | 0×1080 | 0×1000 | | no |
| 13 | 0×10a0 | 0×1000 | | no |
| 14 | 0×10c0 | 0×1000 | | no |
| 15 | 0×10e0 | 0×1000 | | no |
| 16 | 0×1100 | 0×1000 | | no |
| 17 | 0×1120 | 0×1000 | | no |
| 18 | 0×1140 | 0×1000 | | no |
| 19 | 0×1160 | 0×1000 | | no |
| 20 | 0×1180 | 0×1000 | | no |
| 21 | 0×11a0 | 0×1000 | | no |
| 22 | 0×11c0 | 0×1000 | | no |

TABLE III-continued

Results of Example 2 using One-Shot MMOK prediction algorithm.

| Elem. | Virtual Address | Virtual Page | Page of Virtual Address | = | Page of Virtual LastADDR? |
|---|---|---|---|---|---|
| 23 | 0×11e0 | 0×1000 | no | | |
| 24 | 0×1200 | 0×1200 | no | | |
| 25 | 0×1220 | 0×1200 | no | | |
| 26 | 0×1240 | 0×1200 | no | | |
| 27 | 0×1260 | 0×1200 | no | | |
| 28 | 0×1280 | 0×1200 | no | | |
| 29 | 0×12a0 | 0×1200 | no | | |
| 30 | 0×12c0 | 0×1200 | no | | |
| 31 | 0×12e0 | 0×1200 | no | | |
| 32 | 0×1300 | 0×1200 | no | | |
| 33 | 0×1320 | 0×1200 | no | | |
| 34 | 0×1340 | 0×1200 | no | | |
| 35 | 0×1360 | 0×1200 | no | | |

It should be noted that with a relatively large stride MMOK was not asserted and the entire vector has completed. The scalar processor 10 is still waiting for MMOK so it can resume instruction issue. The last element virtual address prediction is so far off that MMOK is never asserted (predicted=0×1600; actual=0×1200).

Pursuant to an additional feature of the invention, prediction inaccuracies inherent in the approximation calculation approach, as shown in Example 2, can be minimized by implementing the prediction logic device 21 to continuously calculate the virtual address for the last data element.

Using a continuous MMOK prediction algorithm, a different last virtual address is calculated for every vector element based on the current element virtual address, the remaining element count, and the stride as follows:

LastVirtADDR = CurrentVirtADDR + (remaining elements * VSTRIDE)

Each element virtual address is compared to the last element virtual address calculated for that element virtual address. If both reside in the same page and the current virtual address has been successfully translated, then MMOK is asserted. Pseudo-code describing this is as follows:

```
/* Init the element count.                         */
element_count = 0
/* Init the remaining element count.               */
remaining_elements = VLENGTH - 1
/* Get starting virtual address.                   */
CurrentVirtADDR = FirstVirtADDR
/* For every element until the end. */
while (element_count < VLENGTH) {
    /* Generate last address approx.               */
    LastVirtADDR =
    CurrentVirtADDR + (remaining elements  * VSTRIDE)
    translate CurrentVirtADDR
    /* Are the current and last virtual addr on
       the same virtual page?                      */
    if (CurrentVirtADDR<31:9> = Last VirtADDR<31:9>
        assert MMOK
    /* Prepare for next element                    */
    element_count = element_count + 1
    CurrentVirtADDR = CurrentVirtADDR + VSTRIDE
    remaining_element = remaining_elements - 1
} /* end while */
```

The following table shows the address generation and last address calculation for each element over the entire vector operation using the continuous algorithm with vector characteristics as in the first one shot algorithm example.

TABLE IV

EXAMPLE 3

| | | |
|---|---|---|
| First VirtADDR | = | 0×0f00 |
| Stride | = | 16 bytes (0×10) |
| Vector length | = | 30 data elements |

Results of Example 3 using Continuous MMOK prediction algorithm.

| Elem. | Remain Elem. | Log Base2 | Stride << | Current ADDR | Last ADDR | Current Page | Last Page | MMOK |
|---|---|---|---|---|---|---|---|---|
| 0 | 29 | 5 | 0×200 | 0×0f00 | 0×1100 | 0×0e00 | 0×1000 | no |
| 1 | 28 | 5 | 0×200 | 0×0f10 | 0×1110 | 0×0e00 | 0×1000 | no |
| 2 | 27 | 5 | 0×200 | 0×0f20 | 0×1120 | 0×0e00 | 0×1000 | no |
| 3 | 26 | 5 | 0×200 | 0×0f30 | 0×1130 | 0×0e00 | 0×1000 | no |
| 4 | 25 | 5 | 0×200 | 0×0f40 | 0×1140 | 0×0e00 | 0×1000 | no |
| 5 | 24 | 5 | 0×200 | 0×0f50 | 0×1150 | 0×0e00 | 0×1000 | no |
| 6 | 23 | 5 | 0×200 | 0×0f60 | 0×1160 | 0×0e00 | 0×1000 | no |
| 7 | 22 | 5 | 0×200 | 0×0f70 | 0×1170 | 0×0e00 | 0×1000 | no |
| 8 | 21 | 5 | 0×200 | 0×0f80 | 0×1180 | 0×0e00 | 0×1000 | no |
| 9 | 20 | 5 | 0×200 | 0×0f90 | 0×1190 | 0×0e00 | 0×1000 | no |
| 10 | 19 | 5 | 0×200 | 0×0fa0 | 0×11a0 | 0×0e00 | 0×1000 | no |
| 11 | 18 | 5 | 0×200 | 0×0fb0 | 0×11b0 | 0×0e00 | 0×1000 | no |
| 12 | 17 | 5 | 0×200 | 0×0fc0 | 0×11c0 | 0×0e00 | 0×1000 | no |
| 13 | 16 | 5 | 0×200 | 0×0fd0 | 0×11d0 | 0×0e00 | 0×1000 | no |
| 14 | 15 | 4 | 0×100 | 0×0fe0 | 0×10e0 | 0×0e00 | 0×1000 | no |
| 15 | 14 | 4 | 0×100 | 0×0ff0 | 0×10f0 | 0×0e00 | 0×1000 | no |
| 16 | 13 | 4 | 0×100 | 0×1000 | 0×1100 | 0×1000 | 0×1000 | MMOK |
| 17 | 12 | 4 | 0×100 | 0×1010 | 0×1110 | 0×1000 | 0×1000 | |
| 18 | 11 | 4 | 0×100 | 0×1020 | 0×1120 | 0×1000 | 0×1000 | |
| 19 | 10 | 4 | 0×100 | 0×1030 | 0×1130 | 0×1000 | 0×1000 | |
| 20 | 9 | 4 | 0×100 | 0×1040 | 0×1140 | 0×1000 | 0×1000 | |
| 21 | 8 | 4 | 0×100 | 0×1050 | 0×1150 | 0×1000 | 0×1000 | |
| 22 | 7 | 3 | 0×080 | 0×1060 | 0×10e0 | 0×1000 | 0×1000 | |
| 23 | 6 | 3 | 0×080 | 0×1070 | 0×10f0 | 0×1000 | 0×1000 | |
| 24 | 5 | 3 | 0×080 | 0×1080 | 0×1100 | 0×1000 | 0×1000 | |
| 25 | 4 | 3 | 0×080 | 0×1090 | 0×1110 | 0×1000 | 0×1000 | |
| 26 | 3 | 2 | 0×040 | 0×10a0 | 0×10e0 | 0×1000 | 0×1000 | |
| 27 | 2 | 2 | 0×040 | 0×10b0 | 0×10f0 | 0×1000 | 0×1000 | |
| 28 | 1 | 1 | 0×020 | 0×10c0 | 0×10e0 | 0×1000 | 0×1000 | |

TABLE IV-continued

| EXAMPLE 3 | | | | | | | |
|---|---|---|---|---|---|---|---|
| 29 | 0 | 0 | 0×010 | 0×10d0 | 0×10e0 | 0×1000 | 0×1000 |

MMOK is asserted at the same element for the continuous prediction algorithm as for the One-shot algorithm in this example. It should be noted that the LastVirtADDR prediction changes for every CurrentVirtADDR and the LastVirtADDR prediction gets significantly better as log base 2 of the remaining element count decreases.

EXAMPLE 4

Example 4 simulates the vector characteristics of the second One-shot MMOK prediction example using the continuous prediction algorithm. Recall that the last element virtual address prediction on a one-shot basis (see Example 2) was so far off the MMOK was not asserted.

TABLE V

| | FirstVirtADDR | | = 0×0f00 | | | | |
|---|---|---|---|---|---|---|---|
| | Stride | | = 32 bytes (0×020) | | | | |
| | Vector length | | = 36 data elements | | | | |

| Results of Example 4 using Continuous MMOK prediction algorithm | | | | | | | |
|---|---|---|---|---|---|---|---|
| Elem. | Remain Elem. | Log Base2 | Stride << | Current ADDR | Last ADDR | Current Page | Last Page | MMOK |
| 0 | 35 | 6 | 0×0800 | 0×0f00 | 0×1700 | 0×0e00 | 0×1600 | no |
| 1 | 34 | 6 | 0×0800 | 0×0f20 | 0×1720 | 0×0e00 | 0×1600 | no |
| 2 | 33 | 6 | 0×0800 | 0×0f40 | 0×1740 | 0×0e00 | 0×1600 | no |
| 3 | 32 | 6 | 0×0800 | 0×0f60 | 0×1760 | 0×0e00 | 0×1600 | no |
| 4 | 31 | 5 | 0×0400 | 0×0f80 | 0×1380 | 0×0e00 | 0×1200 | no |
| 5 | 30 | 5 | 0×0400 | 0×0fa0 | 0×13a0 | 0×0e00 | 0×1200 | no |
| 6 | 29 | 5 | 0×0400 | 0×0fc0 | 0×13c0 | 0×0e00 | 0×1200 | no |
| 7 | 28 | 5 | 0×0400 | 0×0fe0 | 0×13e0 | 0×0e00 | 0×1200 | no |
| 8 | 27 | 5 | 0×0400 | 0×1000 | 0×1400 | 0×1000 | 0×1400 | no |
| 9 | 26 | 5 | 0×0400 | 0×1020 | 0×1420 | 0×1000 | 0×1400 | no |
| 10 | 25 | 5 | 0×0400 | 0×1040 | 0×1440 | 0×1000 | 0×1400 | no |
| 11 | 24 | 5 | 0×0400 | 0×1060 | 0×1460 | 0×1000 | 0×1400 | no |
| 12 | 23 | 5 | 0×0400 | 0×1080 | 0×1480 | 0×1000 | 0×1400 | no |
| 13 | 22 | 5 | 0×0400 | 0×10a0 | 0×14a0 | 0×1000 | 0×1400 | no |
| 14 | 21 | 5 | 0×0400 | 0×10c0 | 0×14c0 | 0×1000 | 0×1400 | no |
| 15 | 20 | 5 | 0×0400 | 0×10e0 | 0×14e0 | 0×1000 | 0×1400 | no |
| 16 | 19 | 5 | 0×0400 | 0×1100 | 0×1500 | 0×1000 | 0×1400 | no |
| 17 | 18 | 5 | 0×0400 | 0×1120 | 0×1520 | 0×1000 | 0×1400 | no |
| 18 | 17 | 5 | 0×0400 | 0×1140 | 0×1540 | 0×1000 | 0×1400 | no |
| 19 | 16 | 5 | 0×0400 | 0×1160 | 0×1560 | 0×1000 | 0×1400 | no |
| 20 | 15 | 4 | 0×0200 | 0×1180 | 0×1380 | 0×1000 | 0×1200 | no |
| 21 | 14 | 4 | 0×0200 | 0×11a0 | 0×13a0 | 0×1000 | 0×1200 | no |
| 22 | 13 | 4 | 0×0200 | 0×11c0 | 0×13c0 | 0×1000 | 0×1200 | no |
| 23 | 12 | 4 | 0×0200 | 0×11e0 | 0×13e0 | 0×1000 | 0×1200 | no |
| 24 | 11 | 4 | 0×0200 | 0×1200 | 0×1400 | 0×1200 | 0×1400 | no |
| 25 | 10 | 4 | 0×0200 | 0×1220 | 0×1420 | 0×1200 | 0×1400 | no |
| 26 | 9 | 4 | 0×0200 | 0×1240 | 0×1440 | 0×1200 | 0×1400 | no |
| 27 | 8 | 4 | 0×0200 | 0×1260 | 0×1460 | 0×1200 | 0×1400 | no |
| 28 | 7 | 3 | 0×0100 | 0×1280 | 0×1380 | 0×1200 | 0×1200 | MMOK |
| 29 | 6 | 3 | 0×0100 | 0×12a0 | 0×13a0 | 0×1200 | 0×1200 | |
| 30 | 5 | 3 | 0×0100 | 0×12c0 | 0×13c0 | 0×1200 | 0×1200 | |
| 31 | 4 | 3 | 0×0100 | 0×12e0 | 0×13e0 | 0×1200 | 0×1200 | |
| 32 | 3 | 2 | 0×0080 | 0×1300 | 0×1380 | 0×1200 | 0×1200 | |
| 33 | 2 | 2 | 0×0080 | 0×1320 | 0×13a0 | 0×1200 | 0×1200 | |
| 34 | 1 | 1 | 0×0040 | 0×1340 | 0×1380 | 0×1200 | 0×1200 | |
| 35 | 0 | 0 | 0×0020 | 0×1360 | 0×1380 | 0×1200 | 0×1200 | |

Using the Continuous algorithm, MMOK returned at vector element 28. In this case, the continuous algorithm predicted far better than the One-shot algorithm and provides the system with a considerable reduction in scalar-vector communication and instruction issue latency.

Figure 5:
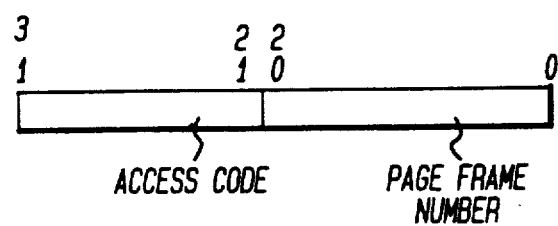
FIG. 5 is a graphic illustration of a page table entry.

Referring now to FIG. 5, each page table entry is 32 bits long with the bits functioning, as follows:
Field Extent: Bits 20:0
Field Name: Page Frame Number (PFN)

Function The page frame number corresponding to the virtual page number of a particular virtual address to be translated.
Field Extent: Bits 31:21
Field Name: Access Code
Function: Bits 31:21 contain memory management code as, for example, a protection code defining which application programs have access to the page table entry.

As should be understood, after a translation buffer hit, the translation mechanism will check the access code to verify that the application program being executed has access to the page table entry. If the program has access, the translation is completed. If not, a memory management fault is asserted and the vector processor stalls, so that the computer system can take an exception, as discussed above.

Pursuant to a feature of a preferred embodiment of the invention, page table entries are loaded into the translation buffer 18 in four contiguous page table entry segments, each segment containing four page table entries for virtual addresses for 2K bytes (512 bytes per page times four contiguous pages). When there is a successful and valid translation of a particular virtual address, the translation mechanism identifies the related page table entries of the 2K byte segment and compares the access code of the other three page table entries of the segment with the access code of the page table entry for the virtual page number of the virtual address which has been successfully translated. A successful comparison indicates that the translation mechanism 15 will be able to translate any of the virtual addresses for the 2K bytes relating to the four page table entries of the segment. This information can be used to assert an MMOK signal, as will appear. A comparison of the access codes is the most straight-forward means for determining access to all four page table entries. However, a full access check for each page table entry of the segment can be implemented to determine access to the segment. A full access check will determine access even if the access codes are different from one another but all permit access by the application program being executed VA <31:11> define the 2K byte segment with VA <10:9> indicating which one of the four page table entries corresponds to the particular 512K page for a virtual address.

Figure 6A:
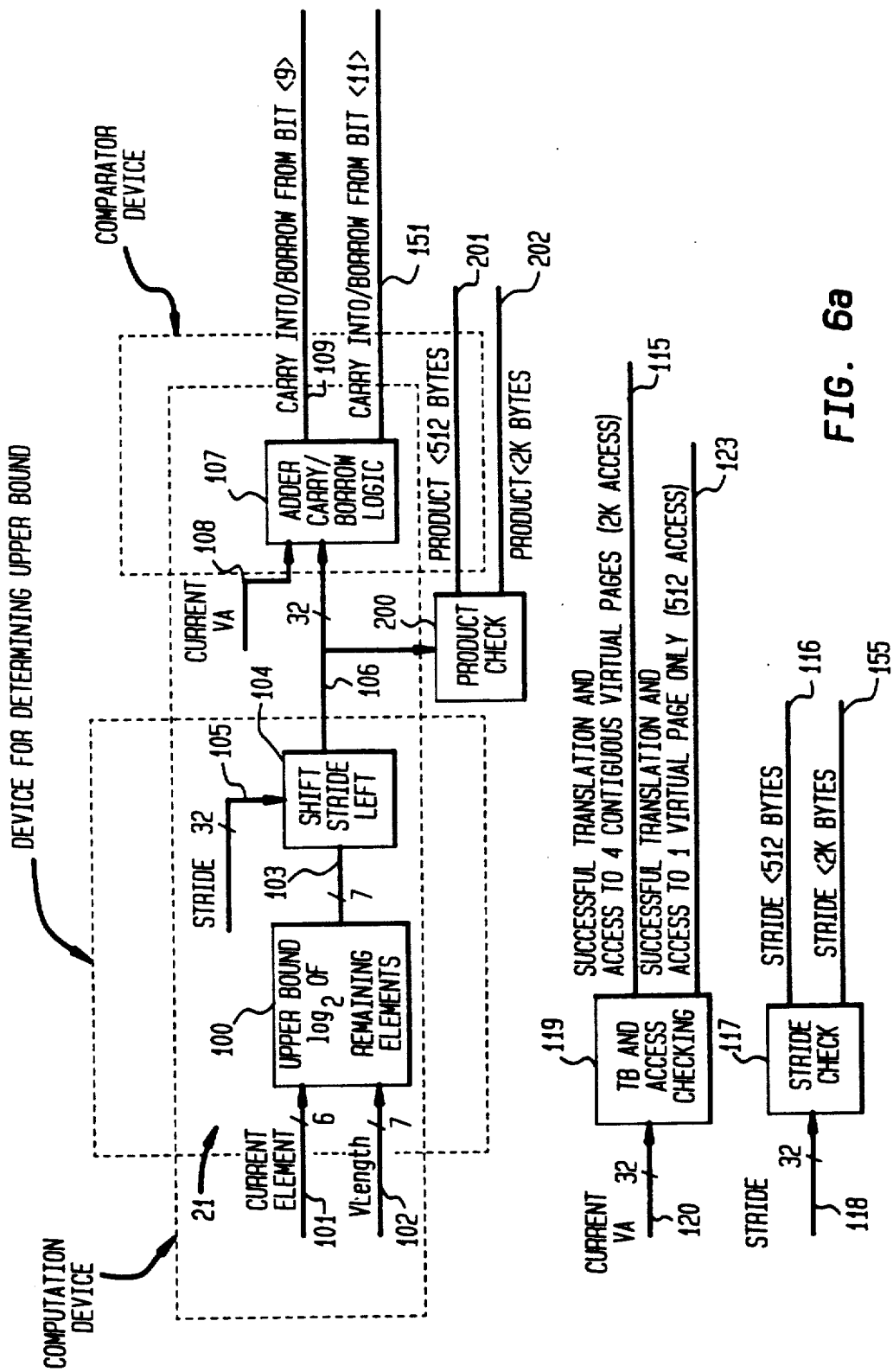
FIGS. 6a and 6b, together provide a block diagram of the prediction logic device of the second processor of FIG. 1.

Referring now to FIGS. 6a and b, there is illustrated a block diagram for the prediction logic device 21 implemented to process a continuous algorithm and CurrentVirtADDR to LastVirtADDR comparison. The current element number and vector length (VLENGTH) are input over lines 101, 102, respectively to a device 100 for determining the remaining element count and the log2 of the remaining element count. The device 100 may comprise, for example, an adder to subtract the current element number from the VLENGTH to yield the remaining element count and a priority encoder to approximate the next higher log2 of the calculated remaining element count. A line 103 couples the device 100 to a shift stride left device 104 to input the log2 of the remaining element count to the shift stride left device 104. An input line 105 inputs the vector stride information to the shift stride left device 104 such that the shift stride left device 104 shifts the stride number to the left by the input log2 of the remaining element count. The result of the shift left operation is output on line 106 which is coupled to an input of each of an adder-carry/borrow logic device 107 and a product check device 200. A second input line 108 is also coupled to the adder-carry/borrow logic device 107 to input the virtual address of the current data element, CurrentVirtADDR.

As discussed above, LastVirtADDR=CurrentVirtADDR+(remaining elements * VSTRIDE). The left shifting of the vector stride (VSTRIDE) by log2 of the remaining element count executed by the shift stride left device 104 provides an approximation of the multiplication product (remaining element * VSTRIDE). The adder-carry/borrow logic device 107 thus adds the left shifted VSTRIDE on line 106 to the CurrentVirtADDR on line 108 to calculate a conservative approximation of the virtual address of the last data element, LastVirtADDR. Each virtual address comprises 32 bits wherein VA <31:9> is the virtual page number and VA <8:0> is the byte within the page. Accordingly, if, during the add operation of the adder-carry/borrow logic device 107, there is neither a carry to or borrow from (note that VSTRIDE may be a negative stride) VA<9> then it becomes known for certain that the virtual page number VA<31:9> of the LastVirtADDR must be the same as the virtual page number VA<31:9> of the CurrentVirtADDR when the product calculated by the shift left stride device 104 is represented in nine bits or less (i.e. the shift left stride is less than 512 bytes) which are added to VA<8:0>. Thus, pursuant to the described embodiment of the invention, a carry into or borrow from VA<9> signal is asserted on an output line 109 when the add operation causes a carry into or borrow from bit 9. The line 109 is coupled to an input of an inverter 110 such that the output line 111 of the inverter asserts a no carry into or borrow from bit 9 signal when the add operation does not cause a carry into or borrow from VA<9>.

Figure 6B:
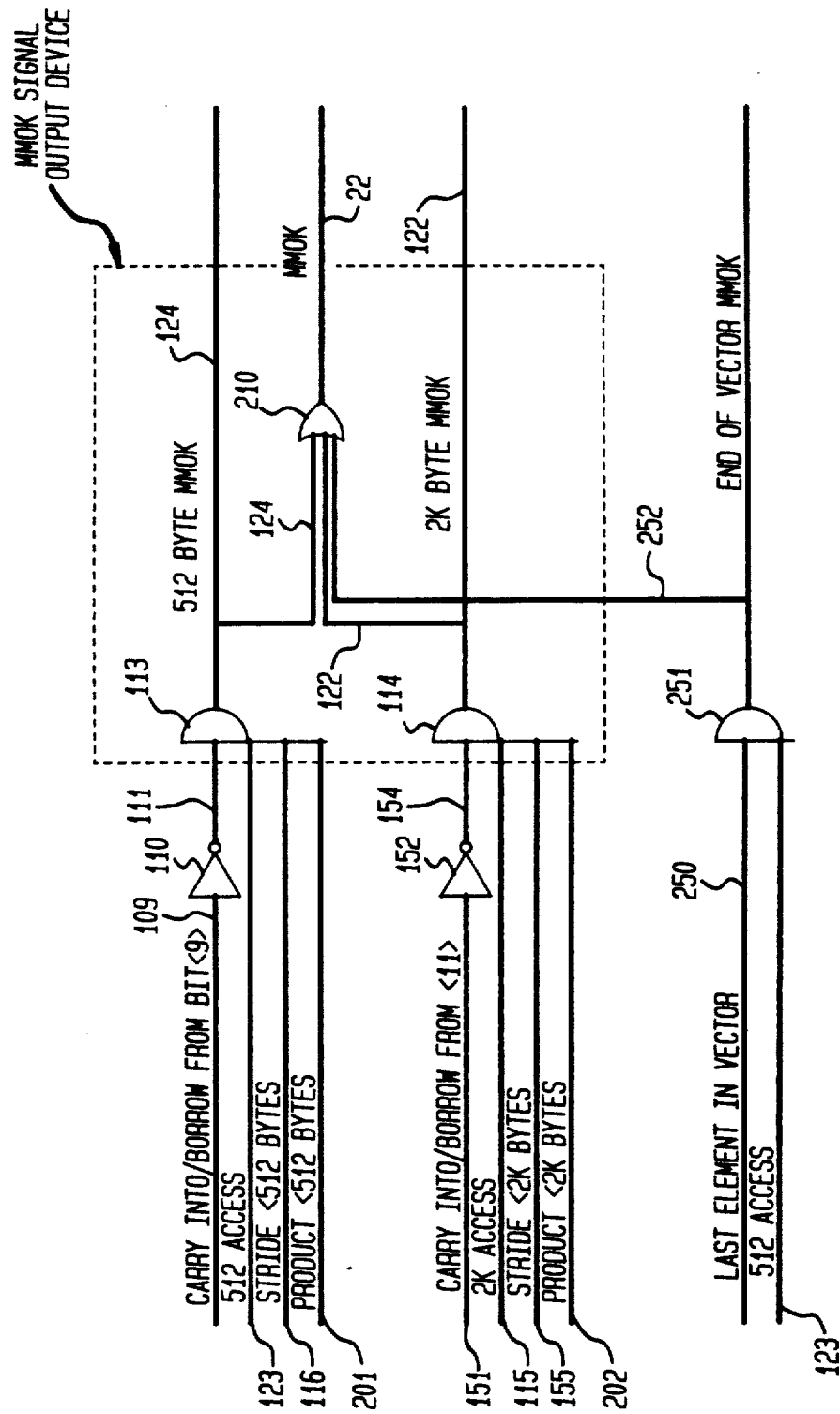

As illustrated in FIG. 6b, the line 111 is coupled to an input of a 512 MMOK AND gate 113. The other inputs of the AND gate 113 are coupled to a Successful Translation and Access to 1 virtual page only line 123 and a stride shift left product <512> byte line 201. The Successful Translation and Access to 1 virtual page only line 123 is coupled to one output of a TB and Access Check Device 119, which comprises the translation mechanism 15 and translation buffer 18 of FIG. 1. The current virtual address is input via a line 120 to the TB and Access Check Device 119 which asserts a signal on line 115 when there has been a successful translation of the current virtual address and the protection or access code comparison indicates that, for purposes of asserting an MMOK signal, only the page table entry for the current virtual address permits access to the physical page by the application program being executed by the computer system. The product check device 200 operates to check the shift left stride value and asserts a signal on line 201 when the shift left stride value is less than 512 bytes to indicate that the no carry into or borrow from VA <9> signal on line 111 provides a certain signal regarding the virtual page identity between Current VirtADDR and Last VirtADDR As should be understood, when signals are asserted on each of lines 111, 123 and 201, a 512 OK signal will be asserted on output line 124 of AND gate 113.

When, on the other hand, the TB and Access Check Device 119 determines that there is a successful translation and that the access code comparison indicates that access is permitted to all four contiguous page table entries of the 2K byte segment, a signal is asserted on a Successful Translation and Access to 4 contiguous virtual pages line 115. The line 115 is coupled to an input of a 2KOK AND gate 114.

The adder-carry/borrow logic device 107 also operates to assert a carry into or borrow from VA <11> signal on an output line 151 when the add operation between the left shifted VSTRIDE and the CurrentVirtADDR causes a carry into or a borrow from VA <11>. Inasmuch as VA <10:9> define the particular page table entry of the 2K byte segment relating to the virtual address, when there is neither a carry into or borrow from bit 11 during the add operation for LastVirtADDR, it becomes known for certain that the page table entry for the approximated LastVirtADDR is within the 2K byte segment when the product calculated by the shift left stride device 104 is represented in 12 bits or less (i.e. the shift left stride is less than 2K bytes) which are added to VA<10:0>. Accordingly, the line 151 is coupled to an inverter 152, the output 154 of which is coupled to the 2KOK AND gate 114. The output 154 provides a no carry to or borrow from bit 11 signal to the 2KOK AND gate 114 when the add operation does not cause either a carry to or borrow from bit 11. Moreover, the product check device 200 asserts a signal on line 202 when the shift left stride value input on line 106 is less than 2K bytes. The line 202 is coupled to an input of the 2KOK AND gate 114. Similar to AND gate 113, if signals are asserted on each of lines 115, 154, and 202, a 2KOK signal will be asserted on output line 122 of the AND gate 114.

Each of the output lines 122, 124 are coupled to respective inputs of an OR gate 210, the output of which comprises the MMOK line 22 (see also FIG. 1). Of course, the TB and Access Check Device 119 will only assert a signal, if any, on one of the lines 115 and 123 at a time such that there will either be a 2KOK or 512 OK signal to the OR gate 210 at any one time. The 2KOK signal permits an even earlier assertion of an MMOK signal in those instances when the LastVirtADDR is not on the same page as CurrentVirtADDR but is within the 2K byte segment and full access to the segment is permitted.

In accordance with the embodiment of the invention illustrated in FIGS. 6a and b, the vector processor 11 asserts a last element in vector signal on a line 250 when it has completed the translation of all of the virtual addresses for the data elements. The line 250 and the line 123 from the TB and Access Check Device 119 are each coupled to inputs of an AND gate 251, the output 252 of which is coupled to an input of the OR gate 210. In this manner, the scalar processor 10 is alerted to a completion of the translation process at the successful completion of the translation of the virtual addresses for all the data elements in the event that an MMOK signal is not previously asserted via AND gates 113 and 114, as, e.g. when there is a memory management fault or translation buffer miss.

What is claimed is:

1. A prediction logic device, which comprises:
a computation device for receiving information relating to vector length and vector stride of a particular vector and serially receiving at least a portion of each of a set of virtual addresses corresponding to an ordered set of data elements of the particular vector;
the computation device operating to calculate virtual address information relating to the last data element of the ordered set of data elements and based upon the information relating to vector length, vector stride and at least one of the virtual addresses of the set of virtual addresses, wherein said computation device includes a device for determining an upper bound approximation of the virtual address information relating to the last data element;
a comparator coupled to the computation device, the comparator arranged to receive serially at least a portion of each of the set of virtual addresses, and operating to compare each of the at least a portion of each of the virtual addresses of the set of virtual addresses, serially, to the upper bound approximation of the virtual address information relating to the last data element;
a translation buffer and access checking device arranged to receive serially translation buffer hit and miss information corresponding to the ordered set of data elements of the particular vector; and
an MMOK signal output device coupled to the comparator and to the translation buffer and access checking device, the MMOK signal output device operating to assert an MMOK signal when:
(i) the comparator indicates a first match between at least a portion of any one of the virtual addresses of the set of virtual addresses and the upper bound approximation of the virtual address information relating to the last data element; and
(ii) the translation buffer hit and miss information indicates a valid translation buffer hit for the any one of the virtual addresses of the set of virtual addresses.

2. The device for determining an upper bound approximation of the virtual address information relating to the last data element of claim 1, wherein said device operates to determine an upper bound log2 of one of the vector length and vector stride, to shift left the other of the vector length and vector stride by the upper bound log2 and to add a first virtual address of a first one of the ordered set of data elements to the left shifted other of vector length and vector stride to calculate the upper bound approximation of the virtual address information relating to the last data element, such that when the comparison of the portion of a particular virtual address from the set of virtual addresses yields a match with the upper bound approximation of the virtual address, and a valid translation buffer hit has been indicated, said prediction logic device issues the MMOK signal.

3. The device for determining an upper bound approximation of the virtual address information relating to the last data element of claim 1, wherein said device includes a first device for continuously determining, in sequence, an upper bound log2 of one of a remaining element count and the vector stride for each data element of the ordered set of data elements and a second device for shifting left, in sequence with the first device, the other of the remaining element count and the vector stride by the upper bound log2 determined by the first device for each data element of the ordered set of data elements such that the continuous determination of the upper bound log2 by the prediction logic device results in a convergence of an approximate last virtual address toward an actual last virtual address for the last data element, thereby improving prediction accuracy of said prediction logic device.

4. The prediction logic device of claim 3 wherein said computation device includes an adder for adding each virtual address of the set of virtual addresses, serially, in sequence with the second device, to an output of the second device to calculate virtual address information for each data element of the ordered set of data elements, the calculated virtual address information comprising a conservative approximation of the virtual address of the last data element, such that when the comparison of the portion of a particular virtual address from the set of virtual addresses yields a match with a corresponding portion of the calculated virtual address information and a valid translation buffer hit has been indicated, said prediction logic device issues the MMOK signal.

5. A prediction logic device which comprises:
a computation device for receiving information relating to vector length and vector stride of the particular vector and serially receiving at least a portion of each of a set of virtual addresses corresponding to an ordered set of data elements of the particular vector;
the computation device operating to calculate virtual address information relating to a last data element of the ordered set of data elements and based upon the information relating to vector length, vector stride and at least one of the virtual addresses of the set of virtual addresses;

the computation device including a first device for continuously determining a remaining data element count, serially, for each one of the ordered set of data elements, a second device for determining the upper bound log base 2 of the remaining element count for each one of the ordered set of data elements and a third device for shifting left the vector stride by the upper bound log base 2 of the remaining element count for each one of the ordered set of data elements;

the computation device further including an adder for adding, in sequence, each one virtual address of the set of virtual addresses to the vector stride shifted left by the third device by the log base 2 of the remaining element count for a one data element of the ordered set of data elements, which one data element corresponds to the one virtual address, to continuously calculate virtual address information relating to the last data element of the ordered set of data elements, serially, for each one of the ordered set of data elements;

a comparator coupled to the computation device, the comparator arranged to receive serially at least a portion of each of the set of virtual address and operating to compare each one of the at least a portion of each one virtual address of the set of virtual addresses, serially, to the virtual address information relating to the last data element for the one data element corresponding to the one virtual address;

a translation buffer and access checking device arranged to receive serially at least a portion of each of the set of virtual addresses corresponding to the ordered set of data elements of the particular vector and to generate translation buffer hit and miss information corresponding to the ordered set of data elements of the particular vector; and an MMOK signal output device coupled to the comparator and to the translation buffer and access checking device, the MMOK signal output device operating to assert an MMOK signal when:

(i) the comparator indicates a first match between at least a portion of any one virtual address of the set of virtual addresses and the virtual address information relating to the last data element for the one data element corresponding to the any one virtual address; and (ii) the translation buffer hit and miss information indicates a valid translation buffer hit for the any one virtual address of the set of virtual addresses.

6. The prediction logic device of claim 5 wherein:

said comparator includes a borrow/carry logic device operating to determine if there is no carry to and no borrow from at least one preselected bit of a virtual address when the virtual address is added to the shifted left vector stride to determine the first match between the any one virtual address and the virtual address information relating to the last data element, and to assert a no borrow/carry signal for each no carry to and no borrow from each at least one preselected bit;

a product check device is coupled to the third device, the product check device operating to determine if the vector stride shifted left by the third device for each virtual address is less than at least one preselected value and asserting an output signal for each at least one preselected value when the vector stride shifted left by the third device for each virtual address is less than the at least one preselected value;

the translation buffer and access checking device operating to assert an access check signal, serially, for each valid translation in accordance with each of at least one predetermined access code check for the set of virtual addresses;

the MMOK output signal device comprising at least one AND gate, each of the at least one preselected bit corresponding to one each of the at least one preselected value and at least one predetermined access code check, the asserted signals for the at least one preselected bit and the corresponding at least one preselected value and the at least one predetermined access code check all being coupled to respective inputs of one of the at least one AND gate;

the outputs of the at least one AND gate each operating to assert the MMOK signal when all of the input signals are asserted simultaneously.

* * * * *